United States Patent Office 3,425,816
Patented Feb. 4, 1969

3,425,816
METHOD OF TREATING GLASS
Harmon M. Garfinkel and James R. Lindenthal, Horseheads, N.Y., assignors to Corning Glass Works, Corning, N.Y., a corporation of New York
No Drawing. Filed Apr. 21, 1965, Ser. No. 449,876
U.S. Cl. 65—30                                      3 Claims
Int. Cl. C03c 17/22

ABSTRACT OF THE DISCLOSURE

This invention is concerned with the chemical strengthening of alkali metal silicate glass articles through an ion exchange reaction employing a bath of molten alkali metal salt. In particular, this invention involves a method for eliminating the discoloration imparted to a glass article being chemically strengthened caused by the contamination of the molten salt with silver ions. The method contemplates the addition of chloride, bromide, iodide, cyanide, chromate, or phosphate ions to the molten salt to complex the silver and thereby suppress the silver ion as an exchangeable ion with the glass.

---

Molten baths are used in various forms of glass treatment. For example, molten salt baths may be employed as quenching media in the glass strengthening process known as tempering. Recently, methods of chemically strengthening glass articles have been proposed wherein the article is immersed in a molten salt bath to effect an ion exchange in the glass surface. It is also known to provide a fire finish on glassware by drawing it through, or otherwise treating it in, a molten bath such as molten metal.

In the course of developing a chemical strengthening method for certain types of volumetric laboratory glassware, it was discovered that, in addition to being strengthened in the molten salt bath, the glass article also frequently was discolored in spots. The yellow discoloration observed occurred particularly in those areas of the article that had been flame worked in the course of producing the particular article from glass tubing.

Subsequent studies revealed that the yellow discoloration resulted from silver contamination in the molten salt bath and was the result of such contaminating silver ions migrating into the glass surface in preference to the alkali metal ions being introduced for strengthening purposes. It was further discovered that this preferential exchange could be minimized, or completely eliminated, by providing a selected halide ion in the salt bath, as by an addition of sodium chloride to the bath. Our invention is primarily based on these various findings and their utilization to provide an improved method of treating a glass article in a molten bath containing silver.

Our invention is an improved method of treating glass in a molten bath containing silver, the improvement comprising the addition to the bath of a silver complexing ion selected from the group consisting of chloride, bromide, iodide, cyanide, chromate, and phosphate to suppress the silver and thereby eliminate glass discoloration. A chloride additive is preferred.

The invention is particularly concerned with chemically strengthening glass by ion exchange in a molten salt bath, and with a method of avoiding discoloration by silver impurities in such strengthening salt bath. It is therefore illustratively described with reference to this embodiment.

United States Patent No. 2,779,136 to Hood et al. describes a method of chemical strengthening wherein lithium ions are exchanged for sodium and/or potassium ions in the surface of a glass article to produce a low expansion glass layer which becomes compressively stressed with respect to the interior of the article as the glass is cooled. Pending United States application Ser. No. 181,887 describes a method of chemical strengthening wherein a relatively large ion is exchanged for a smaller ion from the surface of a glass article without stress relaxation within the surface. This develops a compressively stressed surface layer due to the differential size of the ions.

The latter strengthening method may, for example, be carried out by immersing a lithium-containing, silicate glass in a molten salt bath composed of sodium compound, or compounds, such bath being maintained at a temperature on the order of 350 to 550° C., depending on the glass viscosity characteristics and the rate of exchange desired. For example, a typical $Li_2O$—$Al_2O_3$—$SiO_2$ type glass might be strengthened by immersion in a sodium nitrate bath for two to four hours at 450° C.

The present invention arose out of attempts to utilize such a strengthening method to strenghen tubular glass articles, such as centrifuge tubes, which were produced by reworking glass tubing. Preliminary to the strengthening of such glassware, the glass had graduation markings and other indicia applied within its surface by a paste staining process. In this preliminary treatment, a paste material containing silver and copper compounds was applied to the glass surface in selected areas. The glassware was then heat treated to cause migration of the silver and copper ions into the glass surface to produce a desired coloration in the selected areas that were coated. Thereafter, the stained ware was introduced into a sodium nitrate bath for strengthening purposes.

In developing this method, it was discovered that the strengthened ware frequently had spots of yellow discoloration, particularly in those areas of the glass surface which had been subjected to flame during reworking of the originally drawn tubing. Analyses revealed that the discoloration was caused by the presence of silver ions in the glass. Further analysis then indicated the presence of silver impurities in the molten salt bath of sodium nitrate, such impurities being in the range of 0.0005–0.005% $Ag_2O$. However, even this minute amount of silver impurity appeared to be sufficient to produce silver migration in, and consequent discoloration of, the glass, at least in the flame worked areas.

Investigation showed that the discoloration could be minimized and finally eliminated by adding increasing amounts of sodium chloride (NaCl) to the molten salt bath. The NaCl ionizes to provide chloride ion in the bath which then combines with the silver ion present to form complex ions of the nature observed in aqueous solutions. The effect of this complexing action is to suppress or render ineffective the silver ion as an exchangeable ion in the bath.

Chloride ion may be supplied by any chloride compound capable of ionizing in the salt bath medium. Thus, any of the alkali metal chlorides are generally effective. Bromides and iodides may also be used, the bromide or iodide ion being even more effective than the chloride ion as a complexing agent. However, the iodide ion is somewhat less desirable because of its tendency to oxidize and evolve as a vapor at higher temperatures. Because of convenience, cost, and lack of undesirable side reactions, sodium chloride is generally preferred as an additive.

In addition to the halide ions, a number of other ions are also capable of complexing with silver. Of these, only the cyanide, chromate and phosphate have sufficient physical and chemical stability in molten salt solutions at temperatures up to 550° C., as well as capability of complex ion formation, to be considered useful for present purposes. For example, the sulfate ion is readily available and frequently used to modify a salt bath, but has a complexing power less than one half of one percent of that of the halide ions recited.

The amount of chloride, and consequently sodium chloride addition to the bath required to completely eliminate discoloration, will depend on the amount of silver present in the bath. Also, as will appear shortly, the silver coloration may be minimized, although not completely eliminated, with a lesser amount of chloride additive. The amount of additive required to completely eliminate discoloration may be gauged from our finding that the presence of 6% sodium chloride by weight in a sodium nitrate salt bath is effective with 0.005% silver calculated as $Ag_2O$ in the bath as a contaminant. The amount of additive that can be used in any particular bath will depend on its diluent effect on the effectiveness of the bath as well as its effect in altering the melting point of the bath. Accordingly, no more than about 25% additive should normally be used, while as little as a half percent may have some noticeable effect in some circumstances.

The results of an experimental test are now set forth to show the effects of varying the amount of sodium chloride additive and, at the same time, illustrate specific practice of the invention. In this test, a molten salt bath was provided which contained 85% by weight sodium nitrate and 15% sodium sulfate. Care was taken to avoid the presence of any measurable silver ion contamination in the bath by use of high purity materials and this bath was used as a control. A corresponding bath was set up and sufficient silver nitrate added to the bath to provide 0.005% silver oxide in the bath. Thereafter, increments of sodium chloride were added to the bath successively and glassware was strengthened after each addition. The amount of sodium chloride added in each instance was such as to provide a total content equal to a certain percentage by weight of the bath.

The following table sets forth the bath composition in terms of percent sodium chloride by weight after each addition of sodium chloride. It also shows glass appearance in terms of degree of discoloration observed in flame worked areas of glassware, specifically centrifuge tubes, strengthened by a two hour treatment in the bath while it was at a temperature of 460° C.

TABLE

| Percent NaCl | Glass appearance |
|---|---|
| 0.0 | Yellow discoloration. |
| 1.0 | Same. |
| 2.0 | Discoloration sharply diminished. |
| 4.0 | Faint discoloration. |
| 6.0 | No yellow discoloration. |

It will be understood that various modifications and variations, of the invention as specifically described, are contemplated within the scope of the appended claims. In particular, other complexing ions than the chloride may be employed effectively, the amount of additive will vary with the ion chosen, and the invention may be employed in other methods of treatment than ion exchange strengthening.

We claim:
1. In the method for chemically strengthening alkali metal silicate glasses through an ion exchange reaction employing a bath of molten alkali metal salt to avoid coloration of the glass by silver ions present as impurities in said bath the improvement which comprises complexing silver ions by adding about 0.5–25% by weight of a material capable of providing an ion selected from the group consisting of chloride, bromide, iodide, cyanide, phosphate, and chromate to the bath to inhibit the migration thereof into the glass.

2. A method in accordance with claim 1 wherein the material added is a chloride.

3. A method in accordance with claim 2 wherein the material added is sodium chloride.

References Cited

UNITED STATES PATENTS

| 2,271,038 | 1/1942 | Shaver | 65—116 |
| 2,779,136 | 1/1957 | Hood et al. | 65—30 |
| 3,128,220 | 11/1965 | Weber | 65—30 |
| 3,317,297 | 5/1967 | Ray | 65—30 |

OTHER REFERENCES

Weyl, Coloured Glasses, Dawson's of London, 1959, pp. 410–413 only.

DONALL H. SYLVESTER, *Primary Examiner.*

R. L. LINDSAY, Jr., *Assistant Examiner.*

U.S. Cl. X.R.

65—111